(12) United States Patent
Wehrli

(10) Patent No.: US 9,690,268 B2
(45) Date of Patent: Jun. 27, 2017

(54) TOOL AND METHOD FOR DYNAMIC CONFIGURATION AND IMPLEMENTATION OF DEVICE FIRMWARE UTILIZING DEFINED COMPONENTS

(75) Inventor: Herbert Wehrli, Waedenswil (CH)

(73) Assignee: SIEMENS SCHWEIZ AG, Zürich (CH)

( * ) Notice: Subject to any disclaimer, the term of this patent is extended or adjusted under 35 U.S.C. 154(b) by 547 days.

(21) Appl. No.: 14/348,366

(22) PCT Filed: Sep. 30, 2011

(86) PCT No.: PCT/US2011/054240
§ 371 (c)(1),
(2), (4) Date: Apr. 18, 2014

(87) PCT Pub. No.: WO2013/048440
PCT Pub. Date: Apr. 4, 2013

(65) Prior Publication Data
US 2014/0229015 A1 Aug. 14, 2014

(51) Int. Cl.
G06F 7/00 (2006.01)
G05B 15/02 (2006.01)
H04L 12/24 (2006.01)

(52) U.S. Cl.
CPC ............. G05B 15/02 (2013.01); H04L 41/08 (2013.01)

(58) Field of Classification Search
None
See application file for complete search history.

(56) References Cited

U.S. PATENT DOCUMENTS 8,091,084 B1 * 1/2012 Dobrovolskiy ..... G06F 9/45558
717/126
2005/0055427 A1 3/2005 Frutiger et al.
(Continued)

FOREIGN PATENT DOCUMENTS

CN 1658159 A 8/2005
CN 1808378 A 7/2006
(Continued)

OTHER PUBLICATIONS

CN Office Action dated Jun. 2, 2016, for CN Application No. 201180075203.1, 9 pages.
(Continued)

Primary Examiner — Philip Wang

(57) ABSTRACT

A tool, method and device for configuring a device such as a building automation device for use in a automation system is disclosed. The method includes defining a configuration file related to the functionality of the device, such that the configuration file identifies one or more standardized components stored in communication with the device, transferring the configuration file to a dynamic configurator tool operable within the device, initializing the device according to the dynamic configurator tool and the configuration file, such that the dynamic configurator tool retrieves the one or more standardized components identified by the configuration file, generating an executable file for the device based on the one or more standardized components identified by the configuration file, and operating the device utilizing the generated executable file.

20 Claims, 5 Drawing Sheets

(56) References Cited

U.S. PATENT DOCUMENTS

| | | | |
|---|---|---|---|
| 2005/0198487 A1* | 9/2005 | Zimmer | G06F 9/4411 713/2 |
| 2006/0165105 A1* | 7/2006 | Shenfield | G06F 9/546 370/401 |
| 2008/0057931 A1* | 3/2008 | Nass | H04L 12/2814 455/419 |
| 2009/0141712 A1 | 6/2009 | Maeno | |
| 2009/0157882 A1* | 6/2009 | Kashyap | H04L 69/16 709/227 |
| 2010/0031177 A1* | 2/2010 | Reed | G05B 19/042 715/771 |
| 2015/0331395 A1* | 11/2015 | Hepperla | G05B 11/01 700/9 |

FOREIGN PATENT DOCUMENTS

| | | |
|---|---|---|
| CN | 1841320 A | 10/2006 |
| CN | 101124776 A | 2/2008 |
| WO | 03/079126 A1 | 9/2003 |
| WO | 2009/141712 A1 | 11/2009 |

OTHER PUBLICATIONS

PCT Search Report for PCT Application No. PCT/US2011/054240, dated Jun. 6, 2012. 12 pages.

* cited by examiner

TOOL AND METHOD FOR DYNAMIC CONFIGURATION AND IMPLEMENTATION OF DEVICE FIRMWARE UTILIZING DEFINED COMPONENTS

RELATED APPLICATION

This patent document claims priority under 35 U.S.C. §§119, 365 and all other benefits from PCT Patent Application Serial No. PCT/US2011/054240, filed Sep. 30, 2011, titled: "Tool and Method For Dynamic Configuration and Implementation of Device Firmware Utilizing Defined Components," the content of which is hereby incorporated by reference to the extent permitted by law.

TECHNICAL FIELD

This patent document generally relates to building automation systems and devices and more particularly to a tool and method for configuring, upgrading and interacting with one or more building automation devices adapted for operation within a building automation system.

BACKGROUND

Known building automation systems are typically designed to monitor, report and control the environmental and/or safety conditions within a structure. For example, in order to maintain the temperature at a desired set point, the building automation system may drive one or more environmental control devices to a steady state condition centered on the set point. In order to perform this task, one or more building automation devices must be programmed and/or configured with firmware that provides the instructions and parameters necessary to achieve the desired functionality.

Building automation systems often employ a large number of these building automation devices in order to perform the required monitoring and control functions for a structure and/or a group of structures. Each of these individual building automation devices or class of building automation devices, in turn, requires firmware and configuration to ensure operation and to provide the desired functionality. The firmware utilized by these building automation devices is configured as a single interconnected block of instruction making it difficult to modify any given portion. For example, in order to add or change functionality of one of the building automation devices, the entire firmware package must typically be modified and uploaded. The large number of devices operating within the building automation system further exacerbates this limitation. Thus, in order to implement any desired firmware customization numerous variants of firmware that must be tracked and maintained by the user to address the differences in device vendors or capabilities.

SUMMARY

In one embodiment, a method of dynamic configuration of a device is disclosed. The method includes: defining a configuration file related to the functionality of the device wherein the configuration file identifies one or more standardized components stored in communication with the device; transferring the configuration file to a dynamic configurator tool operable within the device; initializing the device according to the dynamic configurator tool and the configuration file wherein the dynamic configurator tool retrieves the one or more standardized components identified by the configuration file; generating an executable file for the device based on the one or more standardized components identified by the configuration file; and operating the device utilizing the generated executable file.

In another embodiment, a controller configured to implement a dynamically configured user application to operate a building automation device for use in a building automation system is disclosed. The controller includes a processor and a memory in communication with the processor. The memory is configured to store processor-executable instructions which are, in turn, configured to: receive, at the building automation device, a configuration file that identifies a leaf component stored in communication with the building automation device; initiate a dynamic configuration tool, wherein the dynamic configuration tool retrieves the leaf component identified by the configuration file from an accessible store location and configures the leaf component for operation according to the definitions provided in the configuration file; generate an executable file for implementation by the building automation device based on at least the leaf component; and execute the building automation device utilizing the generated executable file.

In yet another embodiment, a method of configuring a building automation device for use in a building automation system is disclosed. The method includes: storing a defined configuration file in a building automation device wherein the configuration file is accessible by a dynamic configurator tool; activating the dynamic configurator tool wherein the dynamic configurator tool retrieves and configures the at least one standardized component defined by the configuration file; generating a user application for execution by the building automation device wherein the user application is based on the at least one standardized component; and operating the building automation device utilizing the generated user application.

Other embodiments are disclosed, and each of the embodiments can be used alone or together in combination. Additional features and advantages of the disclosed embodiments are described in, and will be apparent from, the following Detailed Description and the figures.

DETAILED DESCRIPTION

The disclosed tool, method and system for dynamically configuring and upgrading automation devices within a building automation system provides solutions and capabilities in excess of the known systems described above. For example, the disclosed tool, method and system provide a streamlined process for updating the firmware and software executing on one or more automation devices. Specifically, utilizing the disclosed dynamic configurator tool allows for discrete updating of the firmware and software to include bug fixes, additional features or any other desired upgrade without the need to generate (and maintain) an entire block of firmware and software. The flexibility afforded by the disclosed dynamic configurator tool provides a mechanism and method by which a wide range of devices may be supported and configured. Moreover, the disclosed dynamic configurator tool is scalable across systems of varying sizes and complexities without compromising the flexibility and maintainability inherently provided.

The disclosed method and system for configuring and upgrading automation devices utilize well-defined components having equally well-defined interfaces. The strict definitions under which these components are constructed allow the dynamic configuration tool to select, configure and interact with individual components based on the definition and structure provided by a configuration file. The structure of the configuration file provides a mechanism by which individual components can be assembled and combined to create one or more new compound or composed components. Upon assembly by the dynamic configuration tool, the components form the firmware and instructions to be executed by the automation devices.

Figure 1:
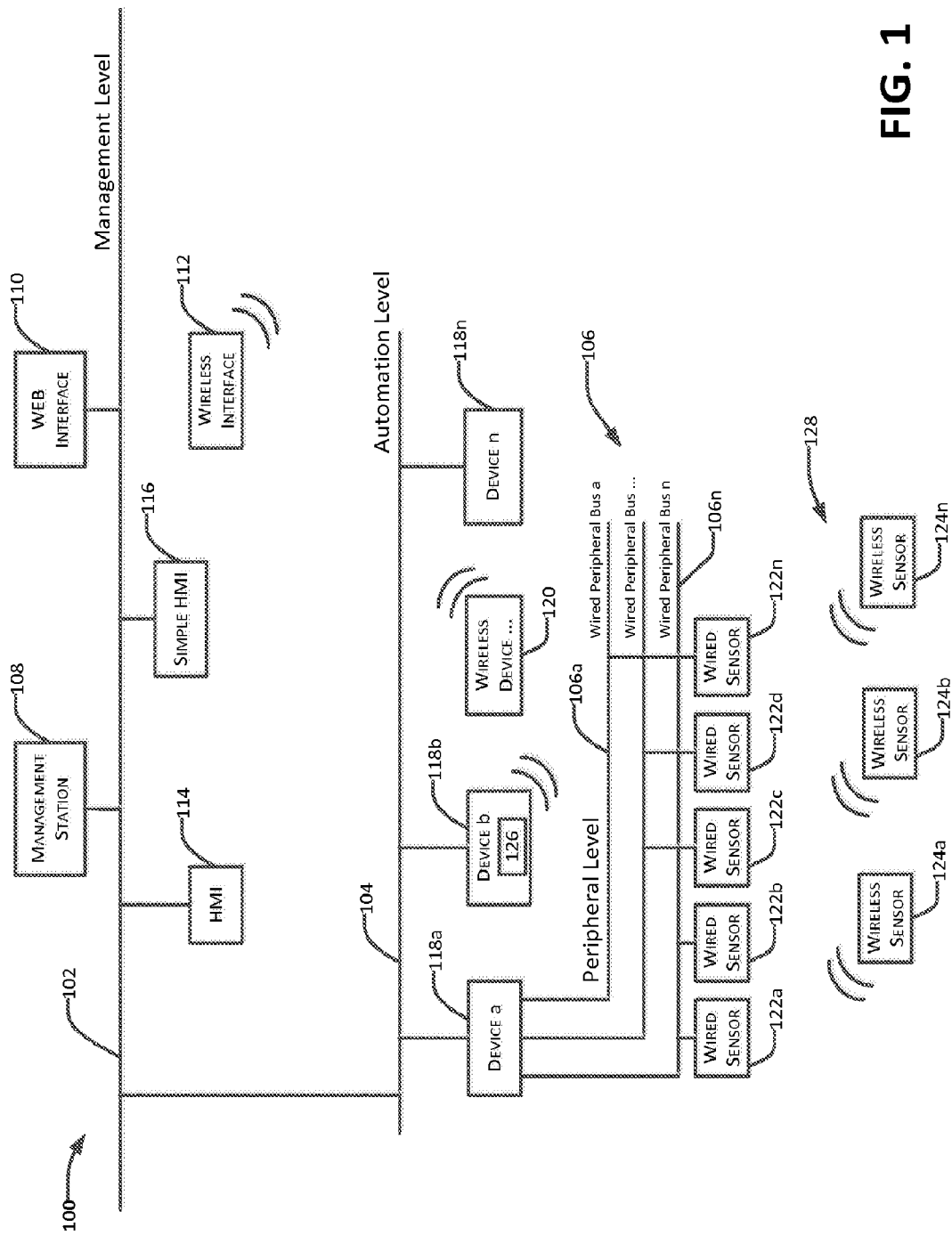
FIG. 1 illustrates an exemplary building automation system configured to utilize the teachings of the present disclosure.

FIG. 1 illustrates an exemplary building control system 100 that may incorporate and implement the tool and method for dynamic configuration disclosed herein. The exemplary control system 100 may be the APOGEE® building management system provided by Siemens Industry Inc., Building Technologies Division ("Siemens"). The control system 100 includes a management level network (MLN) 102 in communication with both an automation level network (ALN) 104 and a peripheral or field level network (FLN) 106. In the present example, the field level network 106 further includes multiple wired peripheral buses 106a to 106n.

The exemplary management level network 102 is shown in communication with one or more workstation or terminal 108. The workstation 108 may be an INSIGHT® Advanced Workstation provided by Siemens and may be configured to interface with and provide user controls to the building control system 100. The workstation 108 may further provide scheduling and operational control of the various mechanical and electrical equipment coupled to the building control system 100. Information, data and alert generated throughout the building control system 100 may be communicated via the networks 102 to 106 for compilation and analysis at the workstation 108. Additional workstations may access and share information received and stored by the workstation 108 for greater flexibility.

The building control system 100 may further be accessed via a web interface 110 such as an APOGEE GO® for INSIGHT® interface provided by Siemens. The web interface 110 provides a clientless means of accessing and viewing critical information gathered by the building control system 100. The web interface 110 may, in one or more embodiments, remotely control device and elements of the building control system 100 in real or near-real time over the Intranet or Internet. The functionality provided by the web interface 110 includes, but is not limited to, monitoring alarms, overriding and establishing command set points and other control parameters, creating and editing operation schedules and reporting functionality.

A wireless interface 112 may further be utilized to provide access to the building control system 100 and the workstation 108. The wireless interface 112 may, in one exemplary embodiment, utilize IEEE 802.11 (WiFi) protocol to communicate and interface with the automation level network 102. The wireless interface 112 provides additional configuration and set-up flexibility to the building control system 100 by eliminating the need to provide a physical network infrastructure to access the automation level network 102 or other element of the building control system 100.

Other human machine interfaces (HMI) 114 and reduced function human machine interfaces 116 may further be utilized to provide access and control to one or more functions of the building control system 100. These interfaces 114, 116 may be configured to provide access to specific mechanical and/or electrical systems operating within the building control system 100. In another embodiment, these interfaces 114, 116 may provide access to the entire building control system 100 either directly or through the workstation 108 and/or the web interface 110.

The automation level network 104 couples to and is in communication with multiple field panels or automation devices 118a to 118n. The field panels may be a PXC Compact and/or a PXC Modular field panels provided by Siemens. The automation devices 118a to 118n may be configured to receive and organize signals exchanged between wired field devices 122a to 122n and translate, those signals into data for communication to, for example, the workstation 108. The exemplary wired field devices 122a to 122n may be sensors, actuators, drives, equipment controllers and other building control devices or sensors. In this configuration, data from these field devices 122a to 122n can be instantly viewable, programmable and actionable at the workstation 108 and/or via the web interface 110.

The automation level network 104 further includes or communicates with a wireless field panel 120 arranged to wirelessly communicate with one or more wireless field devices 124a to 124n. Similar to the wired field devices 122a to 122n, the wireless field devices 124a to 124n may be sensors, actuators, drives, equipment controllers and other building control devices or sensors. The automation device 118b, in this exemplary embodiment, includes a wireless transceiver 126 allowing it to act as a wireless bridge between the wired infrastructure of the automation level network 104 and one or more of the wireless field device 124a to 124n.

The wireless field panel 120 and/or the automation device 118b may cooperate to establish a wireless field level network 128 portion of the field level network 106. In one embodiment, the wireless field level network 128 may be an independent network in communication with the automation level network 104 and the management level network 102. In yet another embodiment, the wireless field level network 128 may be a sub-network and an integral portion of the field level network 106.

The wireless field level network 128 may be established as a wireless mesh network consisting one or more nodes or groups of wireless field device 124a to 124n that communicate to each other via wireless links that are independent of the wireless field panel 120. The mesh configuration provides a wireless field level network 128 that offers enhanced flexibility and redundancy by enabling information or signals to hop among different paths between the wireless field device 124a to 124n before reaching the wireless field panel 120 or automation device 118b. The redundant communication paths enable a high level of reliability by allowing to the network 128 to adjust to potential communication link disruptions. The wireless field device 124a to 124n may be, for example, IEEE 802.15.4 (ZIGBEE®) compliant devices.

Herein, the phrases "coupled with", "in communication with" and "connected to" are defined to mean components arranged to directly or indirectly exchange information, data and commands through one or more intermediate components. The intermediate components may include both hardware and software based components. Similarly, the phrase "operatively coupled" is defined to mean two or more devices configured to share resources or information either directly or indirectly through one or more intermediate components.

Figure 2:
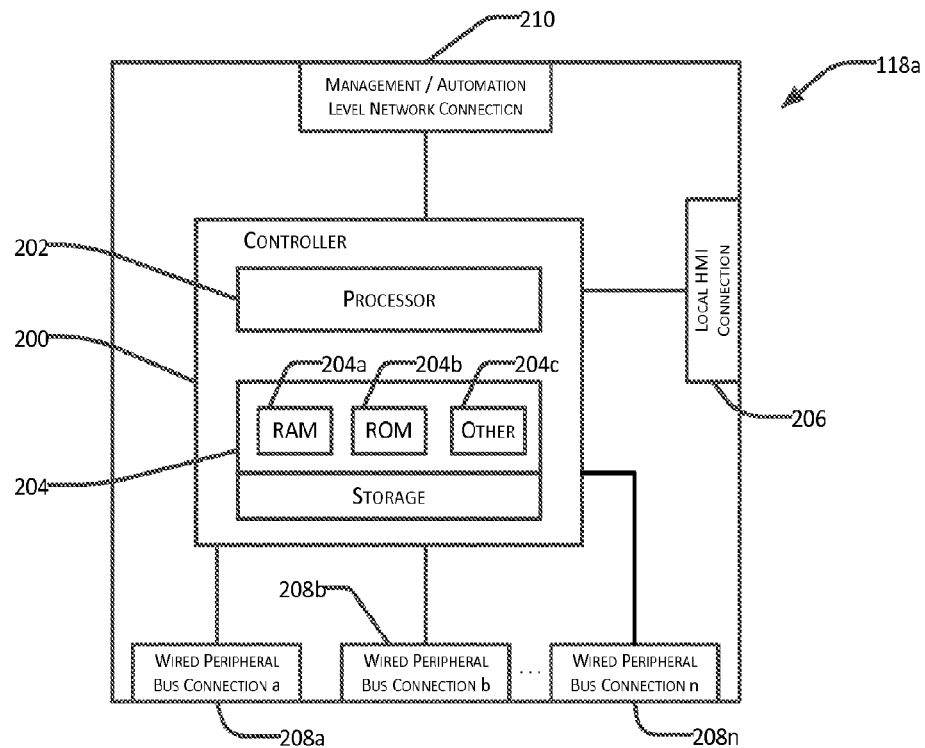
FIG. 2 illustrates an exemplary device operable within the building automation system shown in FIG. 1.

FIG. 2 illustrates an expanded view of the automation device 118a configured to implement and utilized the dynamic configuration tool and principles disclosed herein. In this exemplary embodiment, the automation device 118a (referred to hereinafter as simply the automation device 118) includes a controller 200. The controller 200 includes a processor 202, such as, a central processing unit (CPU), a graphics-processing unit (GPU), or both. The processor hardware may incorporate one or more general processors, digital signal processors, application specific integrated circuits, field programmable gate arrays, servers, networks, digital circuits, analog circuits, combinations thereof, or other now known or later developed devices for analyzing and processing data.

The controller 200 includes a memory 204 coupled to and/or in communication with the processor 202. The memory 204 can be divided or segmented into, for example, a main memory, a static memory, and a dynamic memory. The memory 204 includes, but may not be limited to, computer readable storage media and various types of volatile and non-volatile storage media such as: random access memory (RAM) 204a; read-only memory (ROM) 204b; programmable read-only memory; electrically programmable read-only memory; electrically erasable read-only memory; flash memory; magnetic tape or disk; optical media and the like (collectively identified by the reference numeral 204c). In one configuration, the memory 204 includes a cache or random access memory for the processor 202. Alternatively, or in addition to, the memory 204 may be system memory that is separated and/or distinct from the processor 202.

The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is configured to store processor-executable instructions utilizable by the processor 202. In one or more embodiments disclosed herein, the functions, acts or tasks described may be performed by the processor 202 executing instructions stored in the memory 204. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The controller 200 may further communicate with a local HMI connection 206. The local HMI connection 206 is, in turn, configured to connect to and couple with a display (not shown) such as a liquid crystal display (LCD), an organic light emitting diode (OLED), a flat panel display, a solid state display, a cathode ray tube (CRT), a projector, a printer or other now known or later developed display device for outputting determined information. The local HMI connection 206 may further couple to and communicate with an input device (not shown) such as a keyboard, a touchscreen, touchpad or the like. The display acts as a visual interface for the user to see the functioning of the processor 202 and interact with the software including the processor-executable instructions stored in the memory 204. The input device provides a means by which the user can interact with and control the functioning of the processor 202 based on commands to the software including the processor-executable instructions stored in the memory 204.

The controller 200 may further communicate with wired peripheral bus connections 208a to 208n associated with the one or more multiple wired peripheral buses 106a to 106n. These connections 208a to 208n can provide a one-for-one connection for each of the wired peripheral buses 106a to 106n. In another embodiment, each connection 208a to 208n may be multiplexed to provide connections to multiple wired peripheral buses 106a to 106n. A network connection 210 further couples to and communicates with the controller 200 to allow the automation device 118 to exchange information and data with the management level network 102 and/or the automation level network 104.

Figure 3:
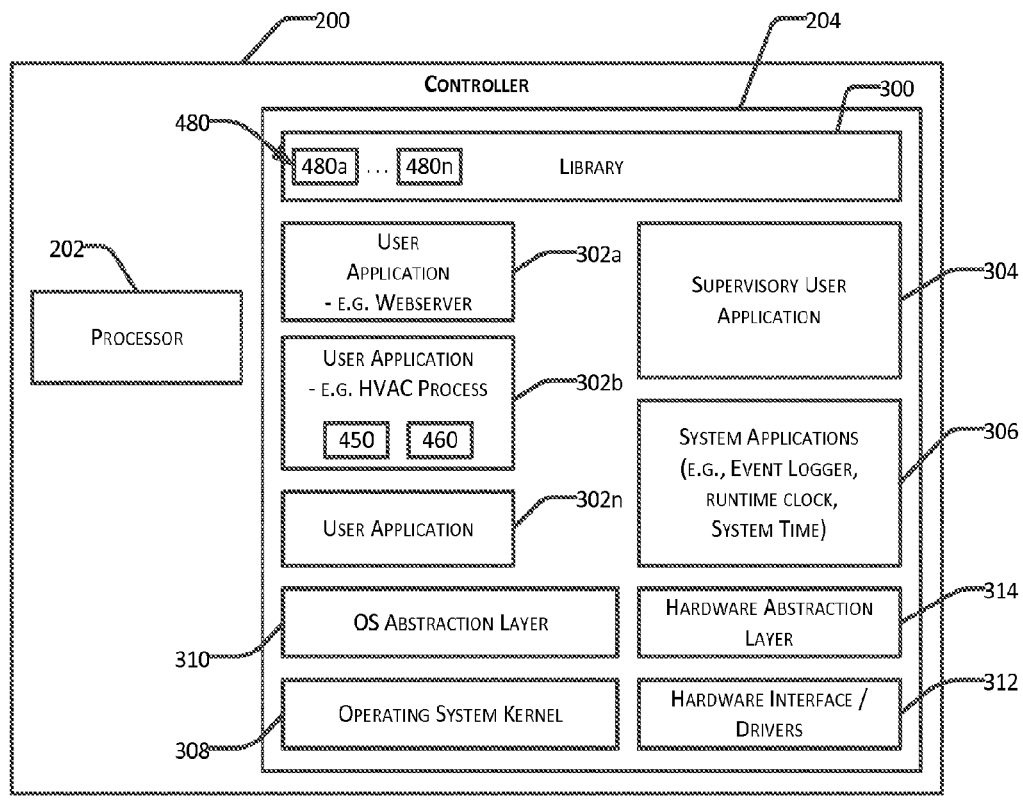
FIG. 3 illustrates an exemplary controller configured to implement the teachings of the present disclosure.

FIG. 3 illustrates an expanded view of the controller 200 configured to implement and utilize the dynamic configuration tool and principles disclosed herein. As previously discussed, the exemplary controller 200 includes the processor 202 and the memory 204 arranged in communication with the processor 202. The memory 204 stores processor-executable instructions and software that includes a library 300 containing code, instructions and data that provide services to one or more stored user applications 302a to 302n. The stored user applications 302a to 302n include or are configured to generate, for example, a web server 302a configured to allow for user interaction and control of the controller 200 and the automation device 118. In another embodiment, the stored user applications 302b may be a heating, ventilation and air conditioning (HVAC) process that controls the operation of the physical plant elements and other mechanical equipment operable within a building.

The stored applications may further include a supervisory application 304 that is configured to communicate, control, monitor and assemble the user applications 302a to 302n. For example, the supervisory application 304 may be configured to coordinate activities and operations performed by each of the stored user applications 302a to 302n. The coordination provided by the supervisory application may include, but is not limited to, error handling, information and data management, runtime order execution and other tasks necessary to smooth operation of the controller 200. In alternate embodiments and configurations other user applications 302a to 302n may be stored or utilized in connection with the wired field devices 122 and/or wireless field devices 124.

In the illustrated embodiment, the user application 302b includes a dynamic configuration tool 450 (see FIG. 4) in communication with a configuration file 450. The configuration file 450 identifies, defines and organizes one or more leaf component 480 (individually identified as leaf components 480a to 480n) stored in a library 300 defined within the memory 204 and accessible by the processor 202 and the dynamic configuration tool 450. Alternatively, the leaf component 480 may be stored externally to the controller 200 in an accessible memory location on, for example, one of the networks 102 and 104. The dynamic configuration tool 450 accesses and reads the information, variables and set-up information contained within the configuration file 460 and pulls or otherwise accesses the one or more leaf component 480 stored in the library 300. The dynamic configuration tool 450 further utilizes the set-up information provided by the configuration file 460 to construct and assemble the user application 302b The memory 204 further includes one or more exemplary system application 306. The system application(s) 306 include one or more tools and algorithms that provide and control the baseline functionality of the automation device 118 operable within the building control system 100. For example, the system application 306 may operate as an event logger, a runtime clock or timer or provide any other functionality common to the operation of the automation device 118.

The memory 204 further supports and stores processor-executable instructions and software that defines an operating system kernel or core 308 and an abstraction layer and interface 310. The abstraction layer and interface 310 provides structured communication and access between the applications 302 to 306 and the operating system kernel or core 308. The operating system kernel or core 308, in turn, establishes a bridge between applications 302 to 306 and the actual data processing done at the processor 202.

Similarly, supported and stored in the memory 204 is a hardware interface and set of drivers 312. A hardware abstraction layer 314 provides for structured communication and access between the hardware drivers 312 and the applications 302 to 306. The hardware drivers 312 provide for interaction and control of one or more external hardware devices such as, for example, the wired devices 122a to 122n, the wireless field devices 124a to 124n and the like.

Figure 4:
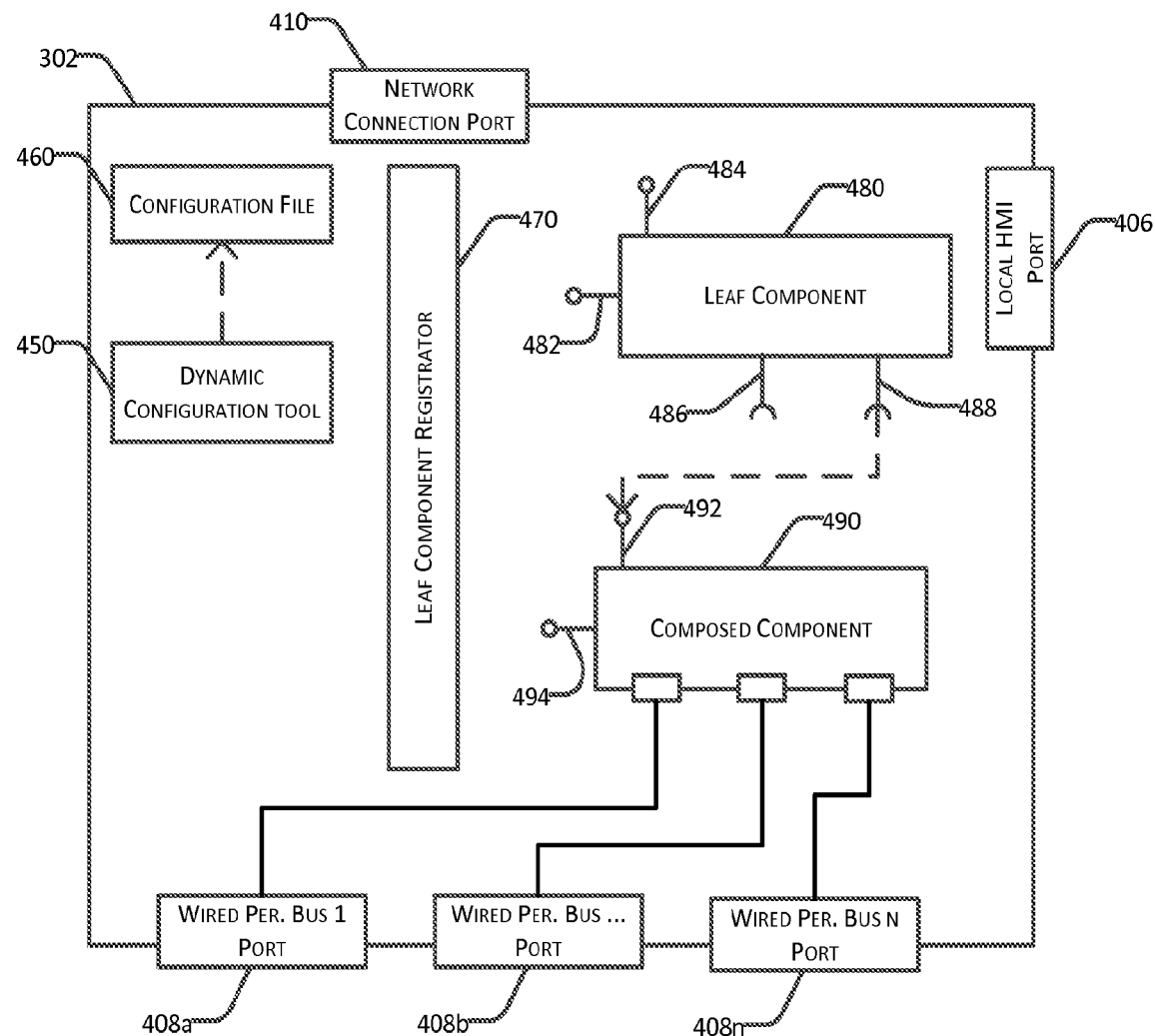
FIG. 4 illustrates an exemplary application assembled utilizing an exemplary dynamic configuration tool.

FIG. 4 illustrates an exemplary configuration of the user application 302b as defined by the configuration file 460 and assembled by the dynamic configuration tool 450. In this exemplary embodiment, the user application 302b represents an HVAC process. However, in other embodiments, the user application 302b (referred to hereinafter as the user application 302) may be any process or application utilized in the operation of an automation device. In this embodiment, the user application 302 includes a network connection port 410 that establishes a virtual/logical data connection that can be accessed to directly exchange information and data with other elements of the automation device 118 and/or the management level network 102 and automation level network 104 via the network connection 210. Similarly, the user application 302 includes a local HMI port 406 to exchange information via the local HMI connection 206. One or more wired peripheral bus ports 408a to 408n for communication with corresponding wired peripheral buses 106a to 106n via connections 208a to 208n may be defined in this configuration of the user application 302.

In operation, the configuration file 460 defines and structure and elements of the user application 302 which is, in turn, utilized by the dynamic configuration tool 450 to assemble the application. For example, the dynamic configuration tool 450 activates upon initialization of the automation device 118 and the controller 200 and reads or otherwise processes the information contained within the configuration file 460. The configuration file 460 and the dynamic configuration tool 450 may, in turn, be identified by a supervisory file provided by the supervisory user application 304 in response to the power-up and/or activation of the automation device 118 and the controller 200. Execution of the supervisory user application 304 may involve reading an exemplary supervisory file such as the one shown in Appendix A. The exemplary supervisory file determines if the user application to be started is the HVAC user application 302b (HVAC_APP) and assigns a unique identification (DEVICE_ID) to the user application 302. The exemplary supervisory file furthers determines if a custom configuration file (i.e., the configuration file 460 in FIGS. 3 and 4) has been specified or if a default configuration should be utilized.

Once the supervisory file identifies the user application 302 and the configuration file 460 for activation and execution, the configuration tool 450 reads the set-up and definition information contained within the configuration file 460. The configuration file 460 can generally be any structured data file such as, for example, an extensible mark-up language (XML) file, that provides a detailed description of the components, elements and the interactions therebetween necessary to define the user application 302. For example, the configuration file 460 may identify and define one or more of the specific leaf components 480 stored in the library 300 that provide the basic functions or functionality required by the user application 302. The configuration file 460 can further define and specify one or more composed components 490 constructed or assembled from individual leaf components 480 and other tools or functionality.

Composed components 490 build upon the basic functionality of leaf components 480 to create elements and tools with increased complexity and capabilities. The dynamic configuration tool 450 and the configuration file 460 are further in communication with a component registrator 470 that verifies the specified set-up and configuration of each composed component 490. Once a leaf component 480 is registered and verified by the registrator 470, its ready for use by the dynamic configuration tool 450.

Individual leaf components 480 may be defined and generated using any native programming language such as, for example, C++ or other known or later developed programming language. As previously discussed, each leaf component 480 can be designed and programmed to provide a specific functionality such as: providing or establishing an input-output (IO) channel; defining an observation or monitoring element, establishing a message generation element or any other programmable element for control and monitoring of the user application 302.

Returning to FIG. 4, the configuration file 460 describes the leaf component 480 as well as the interconnections (both input and outputs) that may be established between other basic components 480 and/or composed components 490. For example, the illustrated exemplary leaf component 480 includes a pair of provided variables or values 482 and 484 defined and established within the structure of the configuration filed 460 and a pair of required variables or inputs 486 and 488. The required variables or inputs 486 and 488 represent data and/or information that must be available to the component 480 in order to initialize and/or operate. In the example, the required variable 488 of the leaf component 480 is shown in communication with a provided variable 492 (one of two provided variable 492 and 494 of the composed component 490).

One example of a configuration file 460 lays out the elements of a leaf component named IOCommon and defines a parameter named Debugmask as having a value of zero. The exemplary configuration file states:

TABLE 1

Basic or Leaf Component Configuration Definition

<LeafComponent_Name = IOCommon>
    <LeadComponentParameter = DeBugMask, ParameterType = Long,
    ParameterValue = 0/>
</LeafComponent>

Figure 5:
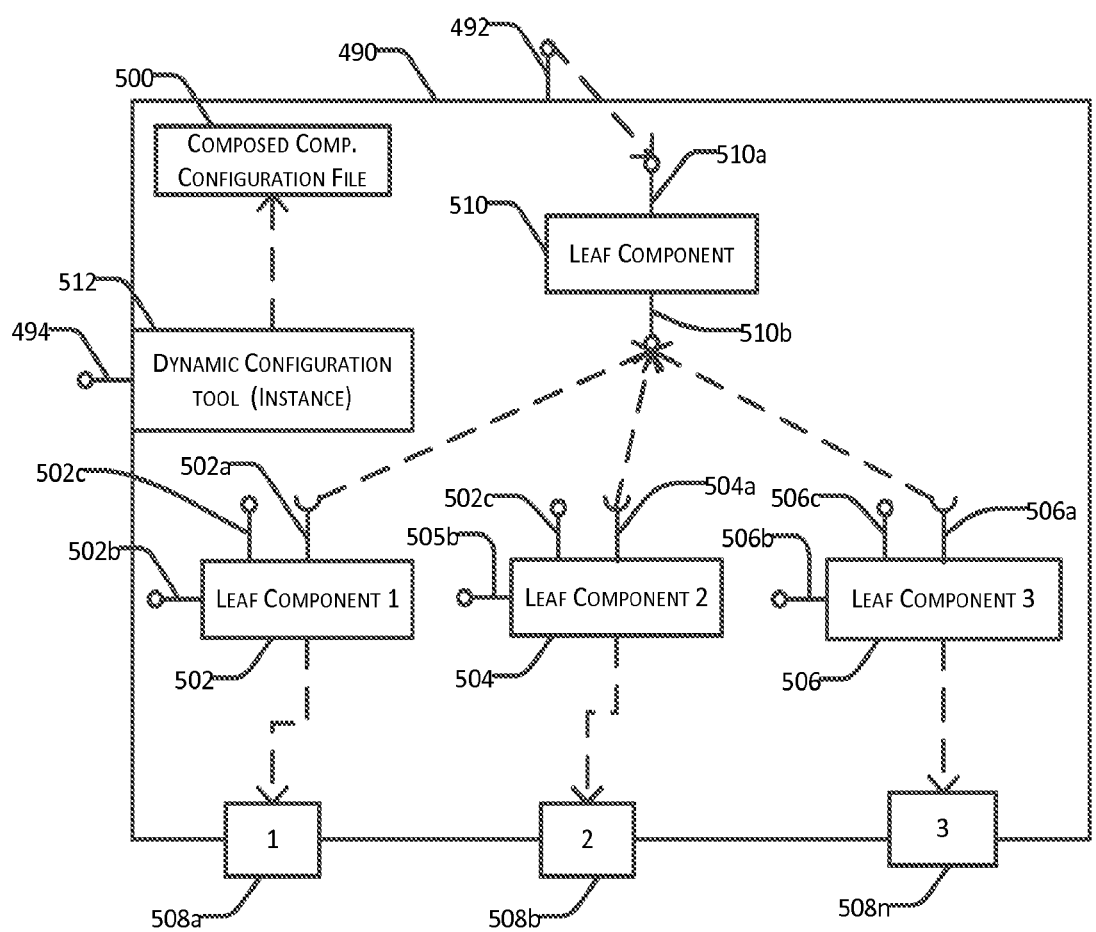
FIG. 5 illustrates another exemplary application assembled utilizing an exemplary dynamic configuration tool.

FIG. 5 illustrates a composed component 490 defined by a composed component configuration file 500 that identifies the individual leaf components 502 to 506 upon which it is constructed. In this manner, an instance of the dynamic configurator tool 512 can read or access the composed component configuration file 500 and assemble the desired structure of the composes component 490. By defining the software and/or firmware in this manner, configuration files can be defined and utilized to assemble successively more detailed architectures without the need to store and maintain the entire resulting application. Instead, the library 300 simply stores the basic components or building blocks of an application and the dynamic configuration tool 450, 512 can assemble the desired application according to the instructions laid out in the configuration file 460, 500. Thus, if multiple instances of the composed component 490 are required and defined within the configuration file 460, then each composed component 490 may be defined by its own structured data configuration file 500 and may constitute a new instance of the composed component 490. In this way, if the composed component 490 is defined or used multiple times within the user application 302, each instance is treated and identified as an independent component and element of the application. This allows components to be reused and re-tasked within the application without creating addressing conflicts.

The configuration file 500 defining the exemplary composed component 490 further establishes connections 508*a* to 508*n* to the wired peripheral ports 408*a* to 408*n* from each of the leaf components 502 to 506, respectively. Each of the illustrated leaf components 502 to 506 includes a required interface 502*a* to 506*a* coupled to a common provided interface 510*b* of the leaf component 510. Moreover, the leaf components 502 to 506, in this exemplary embodiment, are shown to include the provided interfaces 502*b*, 502*c*, 504*b*, 504*c*, 506*b* and 506*c*, respectively. These interfaces represent variables and values that are provided as a part of the definition of the configuration file 500.

In this exemplary embodiment, the leaf component 510 is shown to receive and/or duplicate the provided variable 492 at the provided variable 510*a*. As with the configuration file 460, the composed component configuration file 500 establishes the connections and interfaces between the embedded leaf component and defines any parameters or values necessary for the initialization of the leaf components.

As previously described, the component registrator 470 works with each of the leaf components 480 to ensure the components are fully defined and available for use at startup and during operation. The registration process offered by the component registrator 470 receives a registration request for each leaf component 480 and sets a flag indicating a valid registration.

One exemplary embodiment of a composed component configuration file 500 represents and defines a composed component named DetachedIO. The composed component DetachedIO includes and comprises two leaf components IOHandler and IOCommon (discussed above in Table 1). The configuration file defines the order in which the configuration, preparation and startup sequences are initiated for each of the embedded components. Once the sequences are defined, the configuration file defines a data connection between the embedded components IOHandler and IOCommon. In particular, a connection named IODataAccess originates at the IOHander component and is connected to a second connection named IODataAccessDetached at the embedded leaf component IOCommon. In a similar manner, the configuration defines a port named CIMI and establishes a connection to IOHandler. When this information is stated in structured data format of the configuration file, the configuration file might state or define:

TABLE 2

Configuration Definition of an Exemplary Composed Component Including Two Embedded Leaf Components.

```
<Componentname Name="DetachedIO" />
    <Embeddedcomponents>
        <Leafcomponent Name="IOHandler"/>
        <Leafcomponent Name="IOCommon">
        <LeafComponent_Name = IOCommon>
            <LeadComponentParameter = DeBugMask,
            ParameterType = Long, ParameterValue = 0/>
        </LeafComponent>
    </Embeddedcomponents>
    <Configuresequence>
        <Name>IOHandler</Name>
        <Name>IOCommon</Name>
    </Configuresequence>
    <Preparesequence>
        <Name>IOHandler</Name>
        <Name>IOCommon</Name>
    </Preparesequence>
    <Startupsequence>
        <Name>IOHandler</Name>
        <Name>IOCommon</Name>
    </Startupsequence>
    <Allstaticconnections>
        <Connection Providedby=IOHandler"
        Providedname="IODataAccess" Requiredby="IOCommon"
        Requiredname="IODataAccessDetached"/>
    </Allstaticconnections>
    <Myinterfaces>
        <Connection Myname="InstallChannel"
        Requiredby="IOCommon"/>
    </Myinterfaces>
    <Portdefinitions>
        <Myport Name="CIMI"
        Template="/opt/sysone/s1exe/bin/cimi.sh"/>
    </Portdefinitions>
    <Myports>
        <Port Name="CIMI" Connectsto=IOHandler" Port="CIMI"/>
    </Myports>
</Componentname>
```

Figure 6:
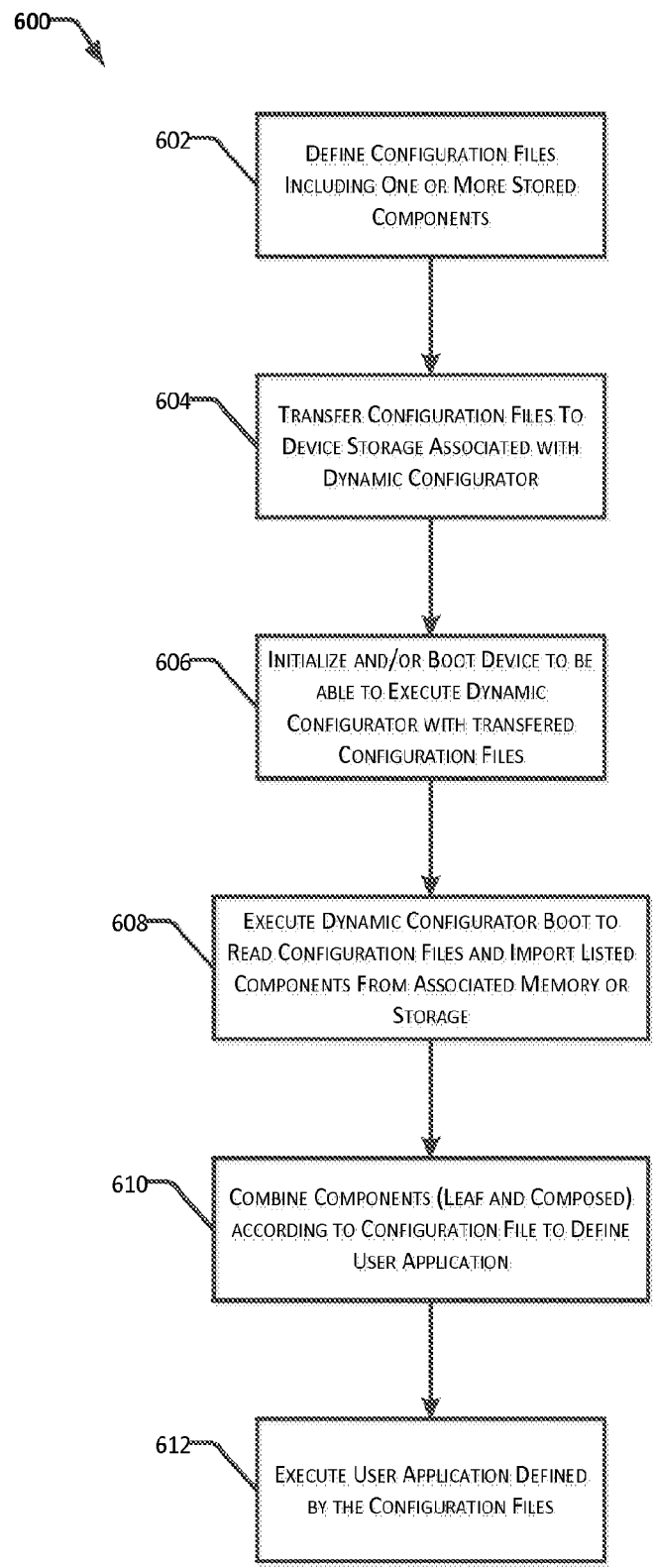
FIG. 6 is a flowchart representing the operation of the dynamic configurator tool and system.

FIG. 6 illustrates an exemplary process (600) by which one of the dynamic configuration tools 450 and 512 and the configuration files 460 and 500 can initiate and cooperate to define portions of the user application 302. The assembly and definition process initiates, as discussed above, with the definition of one or more configuration files. The configuration files define and identify the leaf components and the composed components to be utilized in the control and operation of the automation device (602). One example of a configuration file detailing the configuration and construction of a user application is illustrated in Appendix B. The exemplary user application is identified as "User_Application_One" and is defined in a structured XML format.

Once the configuration files for each of the necessary components has been fully defined in the desired structured format, the resulting file or files are transferred to a bootable storage location within the automation device accessible by the supervisory user application and associated supervisory file. In particular, the configuration files are stored in a bootable location and associated with the dynamic configurator tool for use as the automation device is being configured for operation (604).

The dynamic configuration tool activates when the automation device is power-cycled or initialized for operation (606). For example, when power is applied to an automation device, the supervisory file as shown in Appendix A may activate and identify the configuration file that defines the User_Application_One application shown in Appendix B. Upon activation of the dynamic configuration tool, the configuration files are read and the specified and defined leaf components are imported from a memory location or library accessible by the dynamic configuration tool (608). The imported leaf components may, in turn, be utilized by the dynamic configuration tool to construct one or more composed components as defined and specified by the configuration files (610). Appendix C illustrates an example of a composed component configuration file that may be defined and structured to generate the composed component called "Cn_DetachedIO". The specified leaf and composed components form the elements or basis of the user application (see Appendix B) to be executed by the automation device. Once the elements of the user application have been fully defined and configured, the automation device starts and begins executing the desired user application (612).

The startup and configuration process of the leaf and composed components may be thought of as occurring in three distinct steps that ensure that each component is initiated in a consistent and secure manner. As described above, the first step involves configuring each leaf component to ensure that the provided interfaces have been established and are functioning correctly and that any static connections have been established between the components. When the leaf components have been fully configured, configuration of the composed components begins by establishing the necessary static connections between the leaf components that make-up the composed component. The next step prepares the components for operation by restoring any persistent data stored in memory, establishing any required data structures and creating any objects necessary for the controller to start the user application. The final step starts the individual components and establishes communications between the received and provided interfaces defined for each leaf and composed component. In this manner, user applications and firmware may be defined and assembled for each device and component from a library of constituent components stored and accessible within a system. By assembling the desired firmware for each device as it is needed, the capabilities and functionality of a device and application can be modified simply by altering a configuration file and/or a basic component within the library. This mechanism and methodology provide a highly flexible tool for managing and programming devices without requiring the storage and organization of numerous software and firmware versions for each type and version of a device.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

Appendix A

AN EXEMPLARY SUPERVISORY FILE THAT IDENTIFIES THE NAME AND LOCATION OF THE APPLICATION TO BE STARTED UPON ACTIVATION OF THE AUTOMATION DEVICE.

```
StartApplication( ){
    DebugPrint "StartApplication $APP_PATH/$1"
    cd $APP_PATH
    if [ $1 = $HVAC_APP ]
    then
    DEVICE_ID='fs-value /DEV id'
    DebugPrint "StartApplication - Device ID is $DEVICE_ID"
```

THE SUPERVISORY FILE DETERMINES IF A CONFIGURATION FILE HAS BEEN DEFINED FOR THE IDENTIFIED APPLICATION AND IF NOT, USES THE DEFAULT CONFIGURATION FOR THAT APPLICATION.

```
if [ $DEVICE_ID = "" ]
then
    CONFIG_FILE_NAME="Configuration.xml"
else
    CONFIG_FILE_NAME="Configuration_"$DEVICE_ID".xml"
    if [ ! -f $CONFIG_FILE_PATH/$CONFIG_FILE_NAME ]
    then
    DebugPrint "StartApplication - No Configuration File Found.
Loading $1 with default configuration"
    CONFIG_FILE_NAME="Configuration.xml"
    fi
fi
```

THE SUPERVISORY FILE STARTS THE IDENTIFIED APPLICATION WITH THE PREFERRED CONFIGURATION/CONFIGURATION FILE.

```
DebugPrint "StartApplication $APP_PATH/$1 $CONFIG_FILE_PATH
    $CONFIG_FILE_NAME"
./$1 $CONFIG_FILE_PATH $CONFIG_FILE_NAME &
else
    ./$1 &
fi
```

THE SUPERVISORY FILE CONFIRMS COMPLETION AND STARTUP OF THE IDENTIFIED APPLICATION.

```
        DebugPrint "StartApplication - Done"
        return $!
    }
```

Appendix B

THE CONFIGURATION FILE SETS FORTH THE STRUCTURE, COMPONENTS, VARIABLES AND INTERACTIONS FOR A USER APPLICATION CALLED "USER_APPLICATION_ONE".

```
<?xml version="1.0" encoding="UTF-8"?>
<Componentname Name="User_Application_One"
xmlns:xsi="http://www.w3.org/2001/XMLSchema-instance"
xsi:noNamespaceSchemaLocation="../../../../../
```

DynamicConfigurator/_Documents/Component
XMLSchema/ComponentSchema.xsd">

EACH OF THE LEAF AND COMPOSED COMPONENTS UTILIZED BY THE USER APPLICATION ARE IDENTIFIED AND DEFINED,

```xml
<!--Embedded component section -->
    <Embeddedcomponents>
        <Leafcomponent Name="HMIManager"/>
        <Leafcomponent Name="TimeManager"/>
        <Leafcomponent Name="BA_ObjectInfrastructure"/>
        <Leafcomponent Name="BAWebUI"/>
        <Leafcomponent Name="SibxDataAccess">
            <Leafcomponentparameter
            Name="SibxMetadataFilepath"
                Parametertype="STRING"
                Parametervalue="/opt/user_app_one/s1exe/
                etc/sibxmetadata.xml"/>
            <Leafcomponentparameter
            Name="ObjtypeToPrototypeFilepath"
                Parametertype="STRING"
                Parametervalue="/opt/user_app_one/s1exe/
                etc/runtime_defaults.csv"/>
            <Leafcomponentparameter
            Name="PrototypeToObjtype"
                Parametertype="STRING"
                Parametervalue="/opt/user_app_one/s1exe/
                etc/runtime_prototype_to_bacnet_obj_type.-
                csv"/>
        </Leafcomponent>
        <Leafcomponent Name="TestChannel"/>
        <Leafcomponent Name="FileManager"/>
        <Leafcomponent Name="DBArchive"/>
        <Leafcomponent Name="TrendManager">
            <Leafcomponentparameter Name="BackfillThreshold"
                Parametertype="UINT" Parametervalue="100"/>
        </Leafcomponent>
        <Leafcomponent Name="ChannelObserverBroker"/>
        <Leafcomponent Name="Cn_SARB_TP">
            <Leafcomponentparameter Name="DebugMask"
                Parametertype="ULONG" Parametervalue="0"/>
        </Leafcomponent>
        <Leafcomponent Name="BnTcpServer"/>
        <Leafcomponent Name="InternalTimer"/>
        <Leafcomponent Name="NetworkManagement"/>
        <Leafcomponent Name="ComponentTest"/>
        <Leafcomponent Name="ThreadInfoServer"/>
        <Leafcomponent Name="Diagnostics"/>
        <Leafcomponent Name="S1Infrastructure"/>
        <Leafcomponent Name="Command"/>
        <Leafcomponent Name="S7ExecEngine">
            <!-- CPUModeSwitch position setting on cpu start
            (RUN,RUNP,STOP,RESET)-->
            <Leafcomponentparameter Name="CPUModeSwitch"
                Parametertype="STRING" Parametervalue="RUNP"/>
            <Leafcomponentparameter
            Name="CPURestartModeSwitch"
                Parametertype="STRING" Parametervalue="OB100"/>
        </Leafcomponent>
        <Leafcomponent Name="SystemLogger"/>
        <Leafcomponent Name="NotificationManager"/>
        <Leafcomponent Name="RecipientManager"/>
        <Leafcomponent Name="DataExchange"/>
        <Leafcomponent Name="GroupManager"/>
            <!-- Business Logic primarily used by the web
            application -->
        <Leafcomponent Name="BI_Device"/>
        <Leafcomponent Name="BI_Ba"/>
        <Leafcomponent Name="BI_Pllink"/>
        <Leafcomponent Name="BI_Txio" />
        <Leafcomponent Name="BI_Dali" />
        <Leafcomponent Name="BI_DICP"/>
        <Leafcomponent Name="BI_CSML"/>
        <Leafcomponent Name="SSALoader"/>
        <Composedcomponent Name="Cn_DetachedIO"
            Template="Cn_DetachedIO_Configuration.xml"/>
        <Composedcomponent Name="DALI"
            Template="Cn_DALI_Configuration.xml" />
        <Leafcomponent Name="NodeSetup"/>
        <Leafcomponent Name="BI_ConfigureAndLoad"/>
    </Embeddedcomponents>
```

THE CONFIGURATION FILE DEFINES THE ORDER IN WHICH THE LEAF AND COMPOSED COMPONENTS ARE TO BE CONFIGURED AND PREPARED.

```xml
<!--Configuration sequence section-->
    <Configuresequence>
        <Name>HMIManager</Name>
        <Name>ChannelObserverBroker</Name>
        <Name>Cn_SARB_TP</Name>
        <Name>Cn_DetachedIO</Name>
        <Name>DALI</Name>
        <Name>TimeManager</Name>
        <Name>BA_ObjectInfrastructure</Name>
        <Name>BAWebUI</Name>
        <Name>SibxDataAccess</Name>
        <Name>TestChannel</Name>
        <Name>FileManager</Name>
        <Name>DBArchive</Name>
        <Name>TrendManager</Name>
        <Name>BnTcpServer</Name>
        <Name>InternalTimer</Name>
        <Name>NetworkManagement</Name>
        <Name>ComponentTest</Name>
        <Name>ThreadInfoServer</Name>
        <Name>Diagnostics</Name>
        <Name>S1Infrastructure</Name>
        <Name>Command</Name>
        <Name>S7ExecEngine</Name>
        <Name>SystemLogger</Name>
        <Name>NotificationManager</Name>
        <Name>RecipientManager</Name>
        <Name>DataExchange</Name>
        <Name>GroupManager</Name>
        <!-- Business Logic -->
        <Name>BI_Device</Name>
        <Name>BI_Ba</Name>
        <Name>BI_Pllink</Name>
        <Name>BI_Txio</Name>
        <Name>BI_Dali</Name>
        <Name>BI_DICP</Name>
        <Name>BI_CSML</Name>
        <Name>SSALoader</Name>
        <Name>NodeSetup</Name>
        <Name>BI_ConfigureAndLoad</Name>
    </Configuresequence>
<!--Prepare sequence section -->
    <Preparesequence>
        <Name>NodeSetup</Name>
        <Name>HMIManager</Name>
        <Name>ChannelObserverBroker</Name>
        <Name>Cn_SARB_TP</Name>
        <Name>Cn_DetachedIO</Name>
        <Name>DALI</Name>
        <Name>TimeManager</Name>
        <Name>SibxDataAccess</Name>
        <Name>BA_ObjectInfrastructure</Name>
        <Name>BAWebUI</Name>
        <Name>TestChannel</Name>
        <Name>FileManager</Name>
        <Name>DBArchive</Name>
        <Name>TrendManager</Name>
        <Name>BnTcpServer</Name>
        <Name>InternalTimer</Name>
        <Name>NetworkManagement</Name>
        <Name>ComponentTest</Name>
        <Name>ThreadInfoServer</Name>
        <Name>Diagnostics</Name>
        <Name>S1Infrastructure</Name>
        <Name>Command</Name>
        <Name>S7ExecEngine</Name>
        <Name>SystemLogger</Name>
```

```xml
            <Name>NotificationManager</Name>
            <Name>RecipientManager</Name>
            <Name>DataExchange</Name>
            <Name>GroupManager</Name>
        <!-- Business Logic -->
            <Name>BI_Device</Name>
            <Name>BI_Ba</Name>
            <Name>BI_Pllink</Name>
            <Name>BI_Txio</Name>
            <Name>BI_Dali</Name>
            <Name>BI_DICP</Name>
            <Name>BI_CSML</Name>
            <Name>SSALoader</Name>
            <Name>BI_ConfigureAndLoad</Name>
    </Preparesequence>
```

THE CONFIGURATION FILE DEFINES THE ORDER IN WHICH THE LEAF AND COMPOSED COMPONENTS STARTED IN ORDER TO ENSURE THAT THE REQUIRED AND PROVIDED VARIABLES ARE AVAILABLE TO EACH COMPONENT AS NEEDED FOR START-UP.

```xml
<!--Startup sequence section -->
<Startupsequence>
        <Name>HMIManager</Name>
        <Name>ChannelObserverBroker</Name>
        <Name>Cn_SARB_TP</Name>
        <Name>Cn_DetachedIO</Name>
        <Name>DALI</Name>
        <Name>TimeManager</Name>
        <Name>BA_ObjectInfrastructure</Name>
        <Name>BAWebUI</Name>
        <Name>SibxDataAccess</Name>
        <Name>TestChannel</Name>
        <Name>FileManager</Name>
        <Name>ComponentTest</Name>
        <Name>DBArchive</Name>
        <Name>TrendManager</Name>
        <Name>BnTcpServer</Name>
        <Name>InternalTimer</Name>
        <Name>ThreadInfoServer</Name>
        <Name>Diagnostics</Name>
        <Name>S1Infrastructure</Name>
        <Name>Command</Name>
        <Name>SystemLogger</Name>
        <Name>NotificationManager</Name>
        <Name>RecipientManager</Name>
        <Name>DataExchange</Name>
        <Name>GroupManager</Name>
        <Name>NetworkManagement</Name>
        <Name>S7ExecEngine</Name>
    <!-- Business Logic -->
        <Name>BI_Device</Name>
        <Name>BI_Ba</Name>
        <Name>BI_Pllink</Name>
        <Name>BI_Txio</Name>
        <Name>BI_Dali</Name>
        <Name>BI_DICP</Name>
        <Name>BI_CSML</Name>
        <Name>SSALoader</Name>
        <Name>NodeSetup</Name>
        <Name>BI_ConfigureAndLoad</Name>
</Startupsequence>
<!--Stop sequence section -->
<Stopsequence>
        <Name>NodeSetup</Name>
        <Name>SSALoader</Name>
    <!-- Business Logic -->
        <Name>BI_CSML</Name>
        <Name>BI_DICP</Name>
        <Name>BI_Dali</Name>
        <Name>BI_Pllink</Name>
        <Name>BI_Ba</Name>
        <Name>BI_Device</Name>
        <Name>S7ExecEngine</Name>
        <Name>NetworkManagement</Name>
        <Name>GroupManager</Name>
        <Name>DataExchange</Name>
        <Name>RecipientManager</Name>
        <Name>NotificationManager</Name>
        <Name>SystemLogger</Name>
        <Name>Command</Name>
        <Name>S1Infrastructure</Name>
        <Name>Diagnostics</Name>
        <Name>ThreadInfoServer</Name>
        <Name>InternalTimer</Name>
        <Name>BnTcpServer</Name>
        <Name>TrendManager</Name>
        <Name>DBArchive</Name>
        <Name>ComponentTest</Name>
        <Name>FileManager</Name>
        <Name>TestChannel</Name>
        <Name>SibxDataAccess</Name>
        <Name>BAWebUI</Name>
        <Name>BA_ObjectInfrastructure</Name>
        <Name>TimeManager</Name>
        <Name>DALI</Name>
        <Name>Cn_DetachedIO</Name>
        <Name>Cn_SARB_TP</Name>
        <Name>ChannelObserverBroker</Name>
        <Name>HMIManager</Name>
</Stopsequence>
```

THE CONFIGURATION FILE DEFINES AND ESTABLISHES THE PROVIDED VARIABLES REQUIRED BY ONE OR MORE OF THE COMPONENTS AT START-UP.

```xml
<!--Static connection section -->
<Allstaticconnections>
    <Connection Providedname="AppDatabase"
        Providedby="BA_ObjectInfrastructure" Requiredby="S7ExecEngine"/>
    <Connection Providedname="AppDatabase"
        Providedby="BA_ObjectInfrastructure" Requiredby="BI_Ba"/>
    <Connection Providedname="DeviceServiceHandler" Providedby="BI_Device"
        Requiredby="BI_Ba"/>
    <Connection Providedname="DeviceServiceHandler" Providedby="BI_Device"
        Requiredby="BI_Pllink"/>
    <Connection Providedname="BaServiceHandler" Providedby="BI_Ba"
        Requiredby="BI_Pllink"/>
    <Connection Providedname="DeviceServiceHandler" Providedby="BI_Device"
        Requiredby="BI_Txio"/>
    <Connection Providedname="BaServiceHandler" Providedby="BI_Ba"
        Requiredby="BI_Txio"/>
    <Connection Providedname="DeviceServiceHandler" Providedby="BI_Device"
        Requiredby="BI_Dali" />
    <Connection Providedname="BaServiceHandler" Providedby="BI_Ba"
        Requiredby="BI_Dali" />
```

-continued

```
<Connection Providedname="BnObjectFactory"
    Providedby="BA_ObjectInfrastructure" Requiredby="SibxDataAccess"/>
<Connection Providedname="BnRunTimePrototypes"
    Providedby="BA_ObjectInfrastructure" Requiredby="SibxDataAccess"/>
<Connection Providedname="S7BandyCbk" Providedby="S7ExecEngine"
    Requiredby="SibxDataAccess"/>
<Connection Providedname="FieldBus" Providedby="TestChannel"
    Requiredby="BA_ObjectInfrastructure"/>
<Connection Providedname="DatabaseArchive" Providedby="DBArchive"
    Requiredby="BA_ObjectInfrastructure"/>
<Connection Providedname="BAFileManager" Providedby="FileManager"
    Requiredby="BA_ObjectInfrastructure"/>
<Connection Providedname="DeviceConfigData" Providedby="S1Infrastructure"
    Requiredby="BA_ObjectInfrastructure"/>
<Connection Providedname="DeviceConfigData" Providedby="S1Infrastructure"
    Requiredby="BI_DICP"/>
<Connection Providedname="DeviceConfigData" Providedby="S1Infrastructure"
    Requiredby="NetworkManagement"/>
<Connection Providedname="ILEDMgr" Providedby="HMIManager"
    Requiredby="BI_DICP"/>
<Connection Providedname="IButtonMgr" Providedby="HMIManager"
    Requiredby="BI_DICP"/>
<Connection Providedname="IBnTimeMgr" Providedby="TimeManager"
    Requiredby="BI_DICP"/>
<Connection Providedname="DeviceServiceHandler" Providedby="BI_Device"
    Requiredby="BI_DICP"/>
<Connection Providedname="DeviceConfigData" Providedby="S1Infrastructure"
    Requiredby="BI_Device"/>
<Connection Providedname="S7SrvInf" Providedby="S7ExecEngine"
    Requiredby="BI_Device"/>
<Connection Providedname="S7GrpCbk" Providedby="S7ExecEngine"
    Requiredby="BA_ObjectInfrastructure"/>
<Connection Providedname="S7PrgSync" Providedby="S7ExecEngine"
    Requiredby="DBArchive"/>
<Connection Providedname="SibxDatabaseArchive"
    Providedby="SibxDataAccess" Requiredby="DBArchive"/>
<Connection Providedname="BAMetadataAccess"
    Providedby="SibxDataAccess" Requiredby="BA_ObjectInfrastructure"/>
<Connection Providedname="InstallChannel"
    Providedby="ChannelObserverBroker" Requiredby="Cn_SARB_TP"/>
<Connection Providedname="ILEDMgr" Providedby="HMIManager"
    Requiredby="Cn_SARB_TP"/>
<Connection Providedname="DeviceConfigData" Providedby="S1Infrastructure"
    Requiredby="Cn_SARB_TP"/>
<Connection Providedname="InstallChannel"
    Providedby="ChannelObserverBroker" Requiredby="DALI">
<Connection Providedname="AppDatabase"
    Providedby="BA_ObjectInfrastructure" Requiredby="TestChannel"/>
<Connection Providedname="InstallChannel"
    Providedby="ChannelObserverBroker" Requiredby="TestChannel"/>
<Connection Providedname="IBnNetMgmt" Providedby="NetworkManagement"
    Requiredby="RecipientManager"/>
<Connection Providedname="IBnNetMgmt" Providedby="NetworkManagement"
    Requiredby="BA_ObjectInfrastructure"/>
<Connection Providedname="IBnResMgr" Providedby="RecipientManager"
    Requiredby="BA_ObjectInfrastructure"/>
<Connection Providedname="IBnNotificationMgr"
    Providedby="Notification Manager" Requiredby="BA_ObjectInfrastructure"/>
<Connection Providedname="ChannelObserverFactory"
    Providedby="ChannelObserverBroker"
    Requiredby="BA_ObjectInfrastructure"/>
<Connection Providedname="IBnCOV" Providedby="BA_ObjectInfrastructure"
    Requiredby="NetworkManagement"/>
<Connection Providedname="DeviceServiceHandler" Providedby="BI_Device"
    Requiredby="NetworkManagement"/>
<Connection Providedname="InstallChannel"
    Providedby="ChannelObserverBroker" Requiredby="Cn_DetachedIO"/>
<Connection Providedname="ILEDMgr" Providedby="HMIManager"
    Requiredby="Cn_DetachedIO"/>
<Connection Providedname="IBnTimeMgr" Providedby="TimeManager"
    Requiredby="BA_ObjectInfrastructure"/>
<Connection Providedname="ILEDMgr" Providedby="HMIManager"
    Requiredby="DALI"/>
<Connection Providedname="ILEDMgr" Providedby="HMIManager"
    Requiredby="S7ExecEngine"/>
<Connection Providedname="IButtonMgr" Providedby="HMIManager"
    Requiredby="DALI" />
<Connection Providedname="DeviceConfigData" Providedby="S1Infrastructure"
    Requiredby="NodeSetup"/>
```

```
    <Connection Providedname="DeviceConfigData" Providedby="S1Infrastructure"
        Requiredby="BI_ConfigureAndLoad"/>
    <Connection Providedname="DeviceServiceHandler" Providedby="BI_Device"
        Requiredby="BI_ConfigureAndLoad"/>
    <Connection Providedname="IBnTimeMgr" Providedby="TimeManager"
        Requiredby="BI_ConfigureAndLoad"/>
```

THE CONFIGURATION FILE DEFINES AND ESTABLISHES THE COMMUNICATION PORTS AND CONNECTIONS AVAILABLE AND UTILIZED BY THE USER APPLICATION.

```
</Allstaticconnections>
<Portdefinitions>
    <Myport Name="SARB_TP"
Template="/opt/user_app_one/s1exe/bin/tpuart.sh"/>
</Portdefinitions>
<Myports>
    <Port Name="SARB_TP" Connectsto="Cn_SARB_TP"
    Port="SARB_TP"/>
    <Port Name="DALI-1" Connectsto="DALI"    Port="DALI-1"/>
</Myports>
</Componentname>
```

Appendix C

THE COMPOSED COMPONENT CONFIGURATION FILE SETS FORTH THE STRUCTURE, COMPONENTS, VARIABLES AND INTERACTIONS FOR A COMPOSED COMPONENT CALLED "CN_DETACHEDIO".

```
<Componentname Name="Cn_DetachedIO"
xmlns:xsi="http://www.w3.org/2001/XMLSchema-instance"
xsi:noNamespaceSchemaLocation="../../../../../
DynamicConfigurator/_Documents/Component
XMLSchema/ComponentSchema.xsd">
```

THE COMPOSED COMPONENT CONFIGURATION FILE SETS FORTH EACH OF THE INDIVIDUAL LEAF COMPONENTS USED TO CONSTRUCT THE COMPOSED COMPONENT CALLED "CN_DETACHEDIO".

```
    <Embeddedcomponents>
        <Leafcomponent Name="Cn_TXIOHandler">
        <Leafcomponentparameter Name="DebugMask"
        Parametertype="ULONG"
            Parametervalue="0"/>
        </Leafcomponent>
        <Leafcomponent Name="Cn_IOCommon">
        <Leafcomponentparameter Name="DebugMask"
        Parametertype="ULONG"
            Parametervalue="0"/>
        </Leafcomponent>
    </Embeddedcomponents>
```

THE COMPOSED COMPONENT CONFIGURATION FILE DEFINES THE ORDER IN WHICH EACH OF THE LEAF COMPONENTS IS TO BE CONFIGURED AND PREPARED TO ENSURE CORRECT OPERATION.

```
    <Configuresequence>
        <Name>Cn_TXIOHandler</Name>
        <Name>Cn_IOCommon</Name>
    </Configuresequence>
```

```
    <Preparesequence>
        <Name>Cn_TXIOHandler</Name>
        <Name>Cn_IOCommon</Name>
    </Preparesequence>
```

THE COMPOSED COMPONENT CONFIGURATION FILE DEFINES THE START UP ORDER FOR EACH OF THE LEAF COMPONENTS.

```
    <Startupsequence>
        <Name>Cn_TXIOHandler</Name>
        <Name>Cn_IOCommon</Name>
    </Startupsequence>
```

THE COMPOSED COMPONENT CONFIGURATION FILE DEFINES THE STATIC OR PROVIDED CONNECTIONS FOR EACH OF THE LEAF COMPONENTS.

```
    <Allstaticconnections>
        <Connection Providedby="Cn_TXIOHandler"
        Providedname="IIODataAccess"
        Requiredby="Cn_IOCommon"
        Requiredname="IODataAccessDetached"/>
    </Allstaticconnections>
```

THE CONFIGURATION FILE DEFINES AND ESTABLISHES THE INTERFACES THAT CONNECT THE COMPONENT TO THE OTHER ELEMENTS OF THE USER APPLICATION.

```
    <Myinterfaces>
        <Connection Myname="InstallChannel"
        Requiredby="Cn_IOCommon"/>
        <Connection Myname="ILEDMgr"
        Requiredby="Cn_IOCommon"/>
    </Myinterfaces>
```

THE CONFIGURATION FILE DEFINES AND ESTABLISHES THE COMMUNICATION PORTS AND CONNECTIONS AVAILABLE AND UTILIZED BY THE USER APPLICATION.

```
    <Portdefinitions>
        <Myport Name="CIMI" Template="/opt/sysone/s1exe/
        bin/cimi.sh"/>
    </Portdefinitions>
    <Myports>
        <Port Name="CIMI" Connectsto="Cn_TXIOHandler"
        Port="CIMI"/>
    </Myports>
</Componentname>
```

What is claimed is:

1. A method of dynamically configuring a building automation device controller for use in a building automation system, the method comprising:

defining a configuration file related to the functionality of the controller, wherein the configuration file identifies a plurality of standardized components stored in communication with the controller;

transferring the configuration file to the controller such that the configuration file is accessible by a dynamic configuration tool;

initializing the controller according to the dynamic configuration tool operating in the controller and the configuration file, wherein the dynamic configuration tool retrieves the standardized components identified by the configuration file;

generating a firmware for the controller through operation of the controller based on the standardized components identified by the configuration file; and operating the controller utilizing the generated firmware to communicate with field devices of the building automation system including sensors and actuators.

2. The method of claim 1, wherein initializing the controller further comprises accessing a storage location remote from the controller, wherein the remote storage location is configured to store a plurality of standardized components.

3. The method of claim 1, wherein initializing the controller further comprises initializing the controller without accessing the generated firmware resident in the controller.

4. The method of claim 1, wherein the configuration file is a structured data file that defines one or more properties of the one or more standardized components.

5. The method of claim 4, wherein the configuration file is an extensible mark-up language file.

6. The method of claim 1, wherein the configuration file defines at least one data connection between the standardized components.

7. The method of claim 6, wherein the configuration file defines a plurality of composed components and defines a respective plurality of the standardized components that are combined to form each respective composed component, wherein the generated firmware is comprised of the plurality of composed components.

8. A controller configured to implement a dynamically configured user application to operate a building automation device for use in a building automation system, the controller comprising:

a processor;

a memory in communication with the processor, wherein the memory is configured to store processor-executable instructions configured to:

receive, at the controller, a configuration file that identifies a plurality of leaf components stored in communication with the controller;

initiate a dynamic configuration tool, wherein the dynamic configuration tool retrieves the leaf components identified by the configuration file from an accessible storage location and configures the leaf components for operation according to definitions provided in the configuration file;

generate a firmware for implementation by the controller based on the leaf components retrieved by the dynamic configuration tool that were identified by the configuration file; and execute the controller utilizing the generated firmware to communicate with field devices of the building automation system including sensors and actuators.

9. The controller of claim 8, wherein the accessible storage location is a library defined within the memory of the controller.

10. The controller of claim 8, wherein the configuration file defines a composed component comprising two or more leaf components.

11. The controller of claim 10, wherein the configuration file defines a plurality of composed components and defines a respective plurality of leaf components that are combined to form each respective composed component, wherein the generated firmware is comprised of the plurality of composed components.

12. The controller of claim 8, wherein the configuration file is a structured data file that defines one or more properties of the leaf components.

13. The controller of claim 8, wherein the firmware is in the form of a firmware file configured to control the controller.

14. The controller of claim 13, wherein the firmware file includes at least one user application comprising the leaf components.

15. A method of configuring a building automation device controller for use in a building automation system, the method comprising:

storing a defined configuration file in a controller, wherein the configuration file is accessible by a dynamic configurator tool operating in the controller;

activating the dynamic configurator tool in the controller, wherein the dynamic configurator tool retrieves and configures a plurality of standardized components defined by the configuration file;

generating by the controller a firmware for execution by the controller based on the standardized components retrieved by the dynamic configuration tool that were defined by the configuration file; and operating the controller utilizing the generated user application to communicate with field devices of the building automation system including sensors and actuators.

16. The method of claim 15 further comprising:

defining a configuration file that identifies the standardized components.

17. The method of claim 15, wherein the standardized components are leaf components stored in a memory accessible by the dynamic configuration tool.

18. The method of claim 17, wherein the configuration file defines a plurality of composed components and defines a respective plurality of the standardized components that are combined to form each respective composed component, wherein the generated firmware is comprised of the plurality of composed components.

19. The method of claim 18, wherein the configuration file defines at least one data connection between the standardized components.

20. The method of claim 15, wherein storing the defined configuration file comprises defining a structured data file that configures one or more properties of the one or more standardized components.

* * * * *